(12) United States Patent
Brownell et al.

(10) Patent No.: US 7,403,916 B1
(45) Date of Patent: Jul. 22, 2008

(54) METHOD AND SYSTEM FOR CORRECTING PAYEE NAMES AND ADJUSTING AN ACCOUNT BALANCE FOR A FINANCIAL STATEMENT

(75) Inventors: Christopher Kevin Brownell, Woodinville, WA (US); Justin B. Magaram, Kirkland, WA (US); Sigmund Mandel, Seattle, WA (US); Jan T. Miksovsky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/869,872

(22) Filed: Jun. 2, 1997

(51) Int. Cl.
*G07F 7/00* (2006.01)
*G07B 17/00* (2006.01)

(52) U.S. Cl. .................. 705/33; 705/30; 707/104.1
(58) Field of Classification Search .................. 705/33, 705/30, 34, 35; 707/100, 104.1
See application file for complete search history.

(56) References Cited

U.S. PATENT DOCUMENTS

| | | | | |
|---|---|---|---|---|
| 4,423,321 A | * | 12/1983 | Wilkow | 235/489 |
| 4,910,696 A | * | 3/1990 | Grossman et al. | 364/705.02 |
| 5,093,787 A | * | 3/1992 | Simmons | 705/33 |
| 5,134,564 A | * | 7/1992 | Dunn et al. | 705/33 |
| 5,193,055 A | * | 3/1993 | Brown et al. | 705/33 |
| 5,258,935 A | * | 11/1993 | Ure | 364/705.02 |
| 5,740,427 A | * | 4/1998 | Stoller | 707/104 |
| 5,842,185 A | * | 11/1998 | Chancey et al. | 705/40 |

OTHER PUBLICATIONS

Cummings, Steve Home Banking with Quicken. New York: MIS Press selected pages, Jan. 17, 1996.*
"Microsoft Money" Version 1.0, Microsoft Corporation.
"Microsoft Money" Version 2.0, Microsoft Corporation.
"Microsoft Money" Version 3.0, Microsoft Corporation.
"Microsoft Money" Version 5.0, Microsoft Corporation.
"Microsoft Money" Version 4.0, Microsoft Corporation.
"Making the Most of Microsoft Money", Microsoft Corporation.

* cited by examiner

*Primary Examiner*—Sam Rimell
(74) *Attorney, Agent, or Firm*—Merchant & Gould P.C.

(57) ABSTRACT

Payee names in received financial statements can be substituted for the benefit of users. The financial statements can be electronically received from a financial services provider. The financial statements typically comprise transaction entries that comprise an original payee name. A user can indicate a preferred name for the original payee name. If a match exists between an original name and a preferred name, the preferred name can be substituted for the original payee name. If a match does not exist, an active payee table can be used to display an original payee name.

16 Claims, 15 Drawing Sheets

METHOD AND SYSTEM FOR CORRECTING PAYEE NAMES AND ADJUSTING AN ACCOUNT BALANCE FOR A FINANCIAL STATEMENT

TECHNICAL FIELD

The present invention relates to automatically correcting payee names and adjusting balances within the framework of managing personal finances, and is more particularly directed to managing links between payee names and reconciling ending balances with an on-line banking service.

BACKGROUND OF THE INVENTION

Managing personal finances can sometimes be very tedious and time-consuming. Paying bills, budgeting, investing, saving, and balancing checkbooks are areas that require planning, management, and skill. To assist in these tasks, financial software programs have been developed. These programs are generally designed to assist in understanding personal finances, as well as to make managing them easier.

For example, a financial software program can help a user track personal finances by storing financial information in a file on the user's personal computer. The user can update the file by connecting to an on-line database or banking service using the program and downloading transactions, account balances, and other financial information from the on-line database.

Typically, banks and financial institutions assign names to transactions that are sometimes unusual, complex, and/or confusing for a typical user to read and understand. A bank or financial institution offering credit or checking services also may assign multiple names to what the user may consider to be the same payee. For example, Chevron may be identified as Chevron #1234, Chevron #5678, and Chevron #9012, each representing different Chevron service stations. Because these Chevron service stations are treated like three separate payees due to the name assignment differences, the user may consider this payee name assignment confusing and not very useful. This issue can arise when the user wants to use the financial software program to determine the amount of money that he or she spends each month at Chevron. Thus, there is a need for an automated system for changing payee names presented by the user interface of a financial software program.

A financial software program typically allows a user to operate on a financial statement, such as a checking statement, which includes an initial financial amount or an "opening balance." If the user enters an opening balance within the financial statement, there exists the possibility that a different opening balance may downloaded when the user connects to an on-line financial service. Assuming that the user-entered opening balance amount is different from the opening balance amount downloaded from the on-line database, there is no mechanism within prior financial software programs to correct the user-entered opening balance amount in response to downloading the on-line financial statement. By failing to reconcile the differences between the user-entered and downloaded opening balances, the ending balance in the user's file for the financial statement may also be incorrect. This can result in inaccurate financial records in the absence of a mechanism to synchronize user data with downloaded data.

For example, the "QUICKEN" program, which is marketed by Intuit, Inc. of Menlo Park, Calif., is a financial software program that allows a user to download financial statement data from an on-line service. The opening balance for the QUICKEN program is typically represented as the first transaction in the user's account. It is understood that the QUICKEN program, however, does not update this opening balance transaction in response to downloading on-line financial data containing another opening balance amount. Therefore, the user can potentially maintain an incorrect ending balance as a result of downloading on-line financial information.

In view of the foregoing, there exists increased chances for errors when a user of a financial software program attempts to synchronize or merge data from the user's file with data downloaded from the on-line banking service. There is a further need for a system to assist a user in the synchronization of the financial data from the user's file with the data from the on-line banking service. There is yet a further need for a convenient and efficient system for changing payee names presented by the user interface of a financial software program. There is also a need for a system that reconciles ending balances and corrects an opening balance in a user's file after downloading an on-line financial statement to maintain a correct ending balance in the user's file.

SUMMARY OF THE INVENTION

The present invention satisfies the above-described needs by providing a system for replacing a first parameter of a field in a display screen area with an alternative parameter. Generally described, a first field parameter within a field of the display screen is displayed on a display device. An indication is received that the first field parameter has been changed to the alternative field parameter, also referred to as a second field parameter. In response to this indication, a link is created between the first field parameter and the second field parameter for each occurrence of the first field parameter. Responsive to the link between the first field parameter and the second field parameter, the second field parameter is displayed in the place of the first field parameter within the field of the display screen. In the context of a financial statement, first field parameters are typically actual or original payee names associated with financial transactions, and second field parameters are alternative payee names preferred by the user.

Links between field parameters of the display screen field can be managed to support the automated substitution within the field of a second field parameter for a first field parameter. A link is an aliasing mechanism in a data structure that connects a first field parameter, i.e., the original payee name, to a second field parameter, i.e., the preferred payee name. This link management system can automatically create, delete or change a link in response to a change of a field parameter. For example, a link is created when a preferred payee name is designated as the substitute for an original payee name. The link points to the preferred payee name for each occurrence of the original payee name. Based on this link, the preferred payee name can be displayed without user intervention in the place of the original payee name in the field of the display screen. This substitution can occur without the user seeing the original payee name within the display screen field.

More particularly described, a system is provided for automatically correcting different payee names resulting from the electronic transfer of financial data for use by a financial program operating on a user-created financial statement. The system can automatically rename payees from the assigned bank payee name (original payee name) to a payee name the user prefers (preferred payee name). In response to downloading an on-line financial statement comprising original payee names from an on-line banking service, a first payee name can be displayed to the user in a field of a display screen area. A determination is made that the first payee name has been changed to a substitute payee name. In response, the first payee name is replaced with the substitute payee name within the field of the display screen area for each occurrence of the first payee name.

To eliminate potential user confusion, this aspect of the present invention allows the user to change the original payee name provided by the on-line banking service to any "substitute" name the user prefers. For example, Chevron may be identified as Chevron #1234, Chevron #5678, and Chevron #9012, each representing different Chevron service stations, by an on-line financial service. In this case, the user can decide to change all three original payee names to the preferred payee name of Chevron. By doing so, when the user downloads a transaction having one of the original payee names, in this case, Chevron #1234, Chevron #5678, or Chevron #9012, the inventive system will automatically display the preferred payee name, i.e., Chevron, without user intervention.

Another aspect of the present invention provides a system for reconciling an ending balance in a personal data store with an on-line financial statement provided by an on-line banking service by correcting an opening balance in the personal data store. This automated balance adjustment system can reconcile an ending balance derived from the user's file or a personal data store with the ending balance derived from the on-line banking service before the data is downloaded. This may require correcting the opening balance taken from a user's file so that, after an account has been taken for all transactions, the ending balance in the user's file matches the ending balance in an on-line financial statement provided by the on-line banking service.

In connection with this aspect of the present invention, the personal data store is displayed having an opening balance, transactions organized by date, and the ending balance. The on-line financial statement, which contains transactions organized by date, an ending period, and an ending balance, is then downloaded. Next, the earliest dated transaction in the personal data store is compared to the earliest dated transaction in the on-line financial statement to determine whether the earliest dated transaction in the personal data store is later than the earliest dated transaction in the on-line financial statement. If the earliest dated transaction in the personal data store is not later than the earliest dated transaction in the on-line financial statement, then a determination is made as to whether any transactions have been downloaded into the personal data store. If none of the transactions of the on-line financial statement have been downloaded into the personal data store, then a correct opening balance is calculated. The correct opening balance is then displayed. Preferably, a prompt is displayed indicating that the opening balance has changed to the correct opening balance. The correct opening balance is preferably calculated by subtracting the sum of all transactions in the on-line financial statement from the ending balance in the on-line financial statement.

More particularly described, a determination can be made whether any transactions have been downloaded into the personal data store. The ending balance in the on-line financial statement is compared to the transactions in the personal data store to determine whether any transaction date in the personal data store is the same as the ending period. If so, then all transactions in the personal data store are searched for downloaded transactions in the personal data store starting from the transaction having the same date as the ending period moving backward, one transaction at a time, until the earliest dated transaction in the personal data store is reached. Similarly, if there is no transaction date that is the same as the ending period, then the closest transaction date in the personal data store that occurs before the ending period is located, and all transactions are searched for any downloaded transactions in said personal data store from the closest transaction date backward, one transaction at a time, to the earliest dated transaction in the personal data store. Consequently, each downloaded transaction is designated by a flag to indicate which transaction of the plurality of transactions has been downloaded.

In view of the foregoing, the present invention provides an improved system for assisting the user in the synchronization of the financial data from the user's file with the data from the on-line banking service. The present invention also provides an automated system for changing payee names. In addition, the present invention provides an improved system for maintaining payee name links by automatically creating, deleting or changing links. The present invention also provides a system for automatically reconciling ending balances without manual intervention.

These and other objects, features, and advantages of the present invention may be more clearly understood and appreciated from a review of the following detailed description of the disclosed embodiments and by reference to the appended drawings and claims.

DETAILED DESCRIPTION

The present invention is directed toward a system for synchronizing data from an on-line banking service with a personal data store utilizing Automatically Correct Payee Name and Automatic Balance Adjustment. In one embodiment, the invention is incorporated into a financial software application program entitled "MICROSOFT MONEY 5.0", (hereinafter "MONEY") marketed by Microsoft Corporation of Redmond, Wash. Briefly described, the program allows a user to keep track of personal finances by storing financial information in a file on the user's personal computer. The user can update the file by connecting to an on-line database or banking service using the MONEY program and downloading transactions, account balances, and other financial information from the on-line banking service into the user's file. Automatically Correct Payee Name and Automatic Balance Adjustment will be described in greater detail herein below with respect to FIGS. 2-12, wherein like elements are represented by like numerals throughout the several figures.

Figure 1:
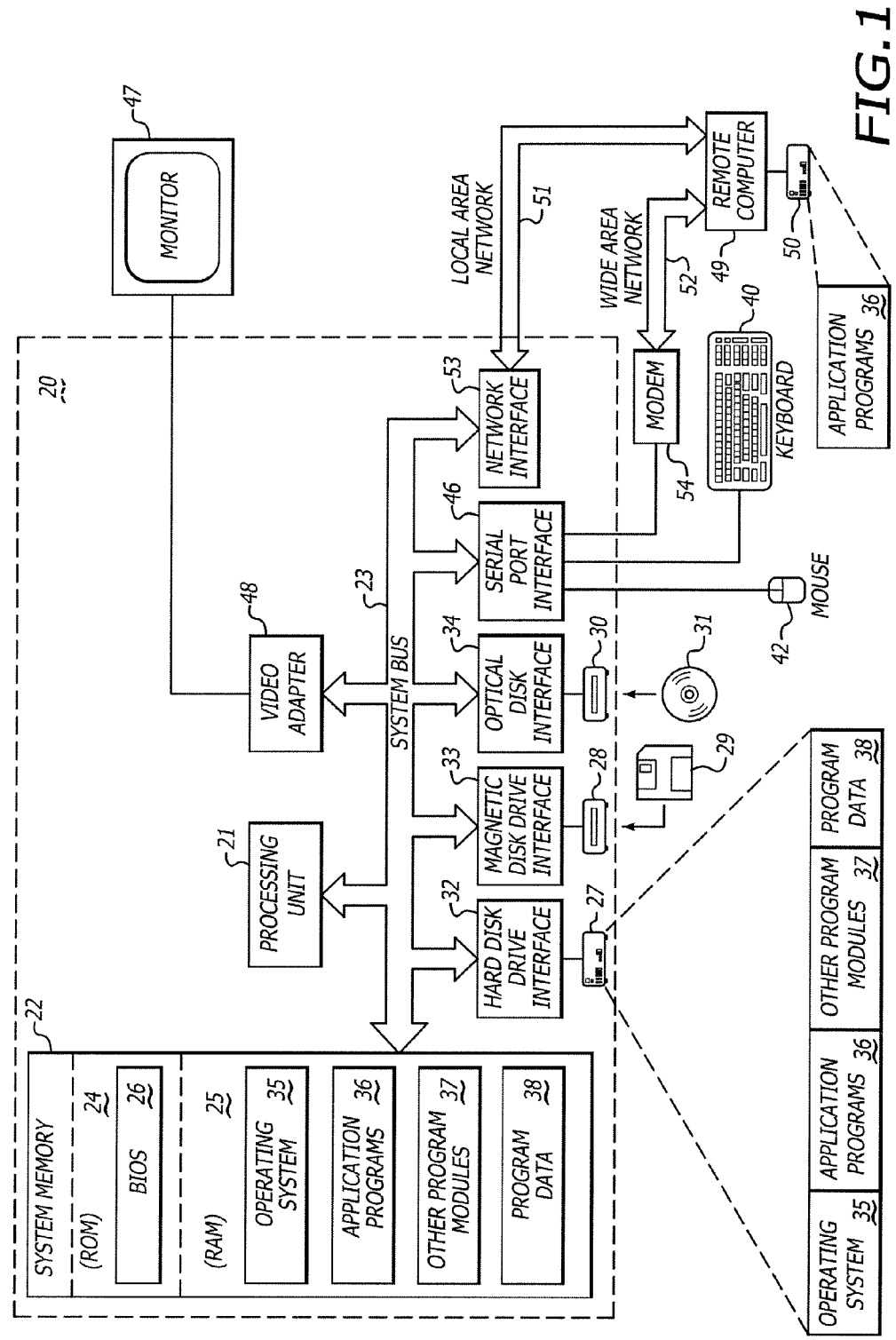
FIG. 1 is a block diagram of a personal computer that provides an exemplary operating environment for the exemplary embodiment of the present invention.

Now turning to FIG. 1, an exemplary operating environment in accordance with the exemplary embodiment of the present invention is now described.

Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Automatically Correct Payee Name

With continuing reference to FIG. 1 and now turning to FIGS. 2-6d, the user's environment for the exemplary embodiment of the present invention will be described by utilizing screen displays generated by the preferred application program.

FIGS. 2-6d illustrate the screen displays provided by the preferred program module to allow the user to change a payee name provided by a bank to a payee name that the user prefers. For purposes of this discussion, the terms "original payee name" and "preferred payee name" are used to describe a name provided by a bank and a name that the user prefers, respectively.

Figure 2:
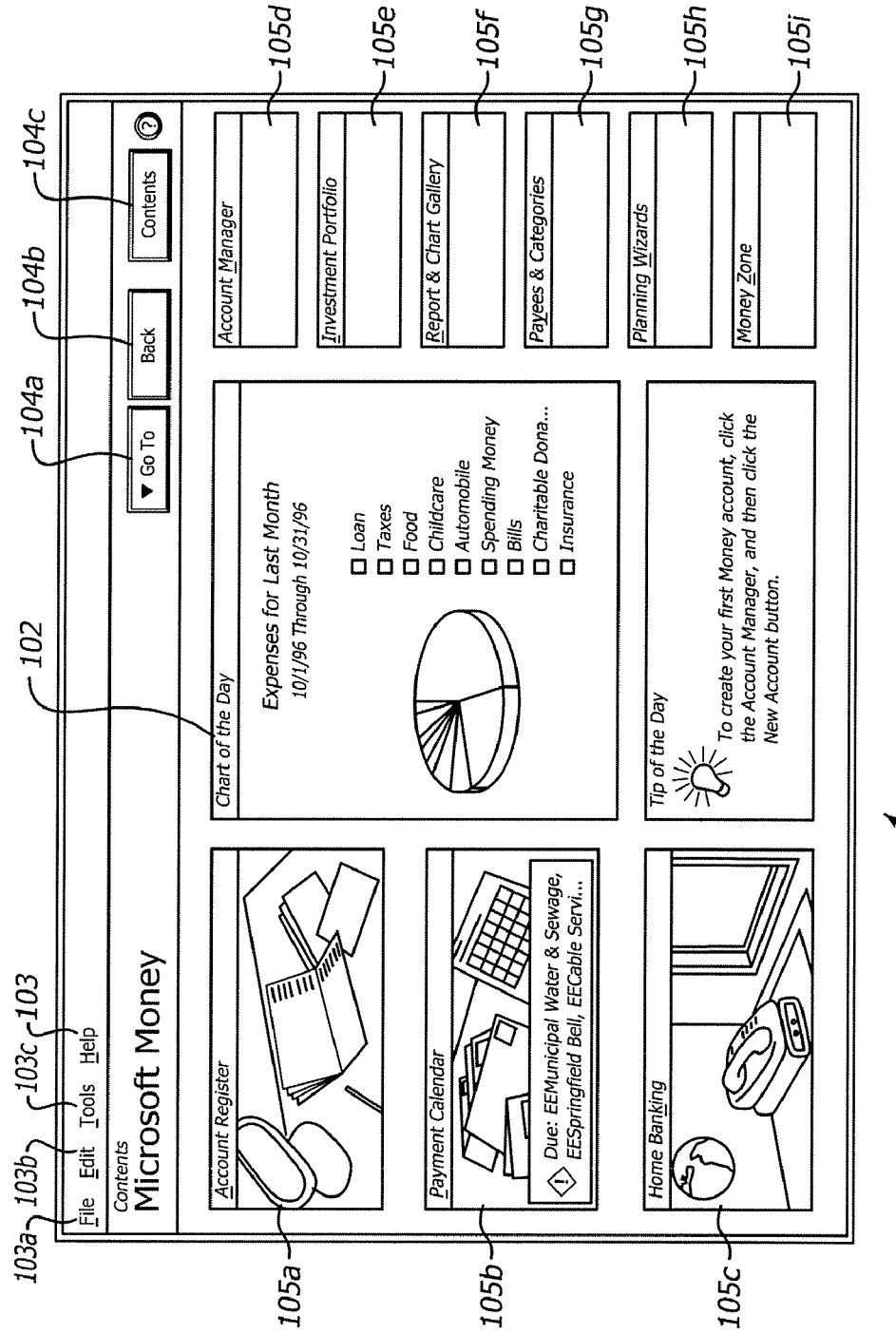
FIG. 2 is a screen display illustrating an initial display screen in accordance with the exemplary embodiment of the present invention.

FIG. 2 depicts an initial display screen 100 that is displayed on the monitor 47. The display screen 100 includes the display area 102, a series of general operational choice menus 103a-d, operational buttons 104a-c and contents icons 105a-i. The display screen 100 is displayed on the monitor 47 by the preferred program module after the user selects the preferred program module from among the application programs 36, which is stored in the system memory 22 of the computer 20.

Because this aspect of the invention focuses on changing payee names, demonstration of this aspect is implemented using the Home Banking content displayed in the display screen area 102 of the display screen 100. The Home Banking content provides information about the user's accounts, banking statements, payments in progress, and contact information. The Home Banking content allows the user to connect to an on-line banking service for conducting general banking functions such as making payments, transferring money between accounts, and so on. The user selects the Home Banking content by clicking onto the Home Banking icon 105c using the mouse 42.

Figure 3:
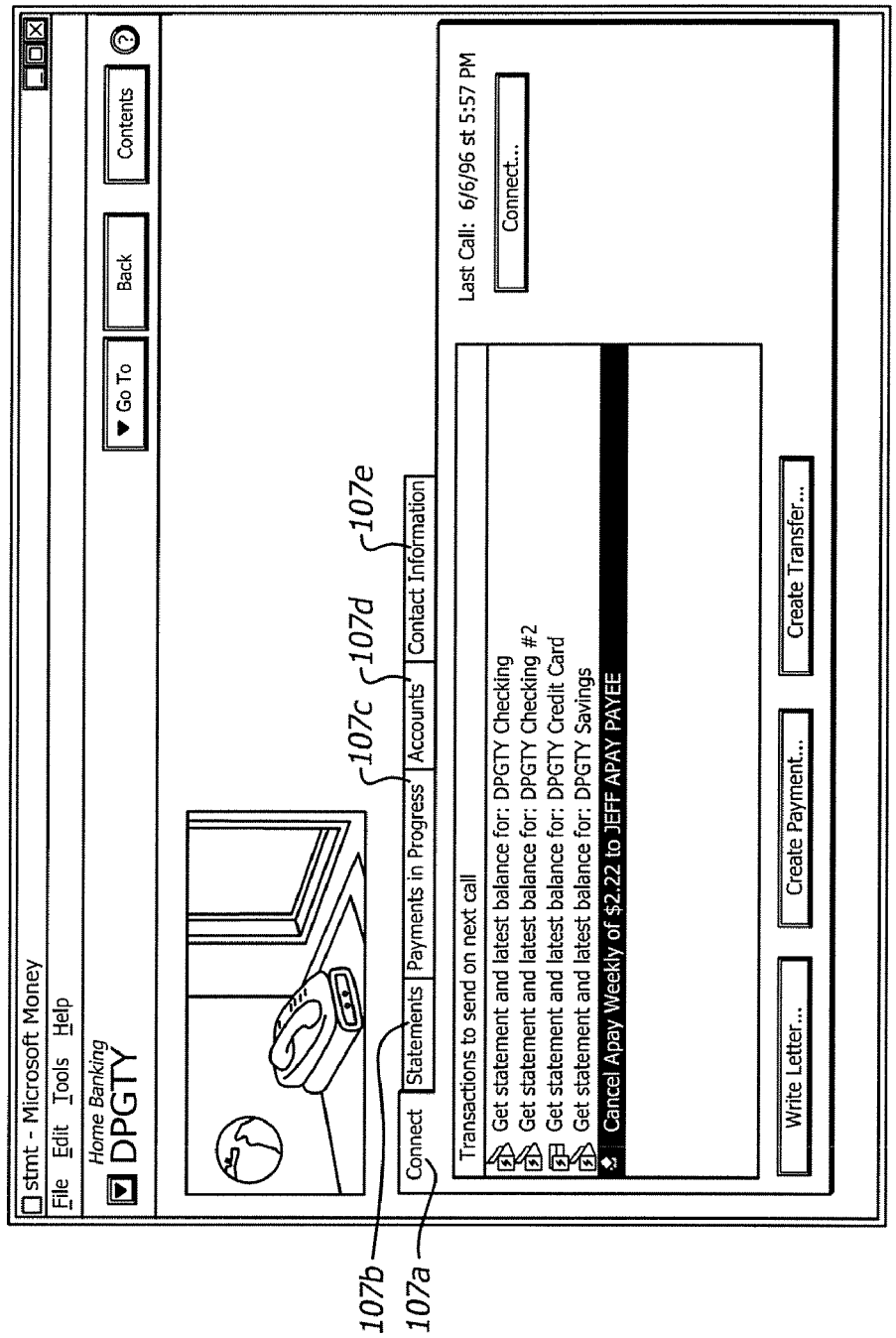
FIG. 3 is a screen display illustrating a home banking display screen in accordance with the exemplary embodiment of the present invention.
Figure 4:
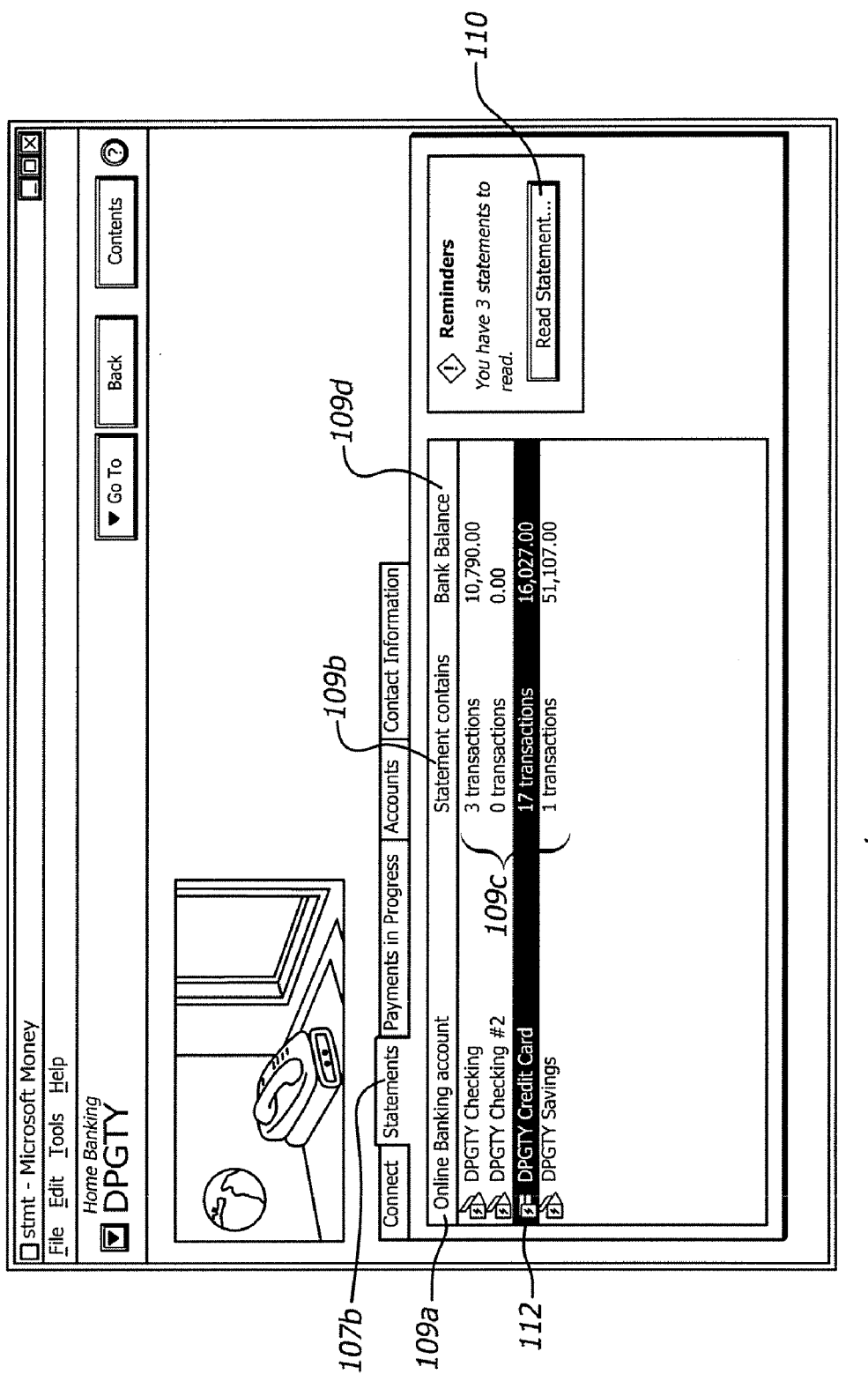
FIG. 4 is a screen display illustrating a selection of the Statements tab in accordance with the exemplary embodiment of the present invention.

Now turning to FIG. 3, after the user clicks onto the Home Banking icon 105c using the mouse 42, a home banking display screen 120 is displayed on the monitor 47 in accordance with the exemplary embodiment of the present invention. The home banking display screen 120 contains a series of tabs 107a-e, each containing a list of items containing information associated with each tab. For purposes of this discussion, emphasis will be placed on the Statements tab 107b for demonstration of the ACPN feature. To obtain a list of the financial statements for each account, the user simply clicks onto the Statements tab 107b using the mouse 42. After doing so, the Statements tab 107b and associated content move to the forefront of the home banking display screen 120, as shown in FIG. 4.

Figure 5:
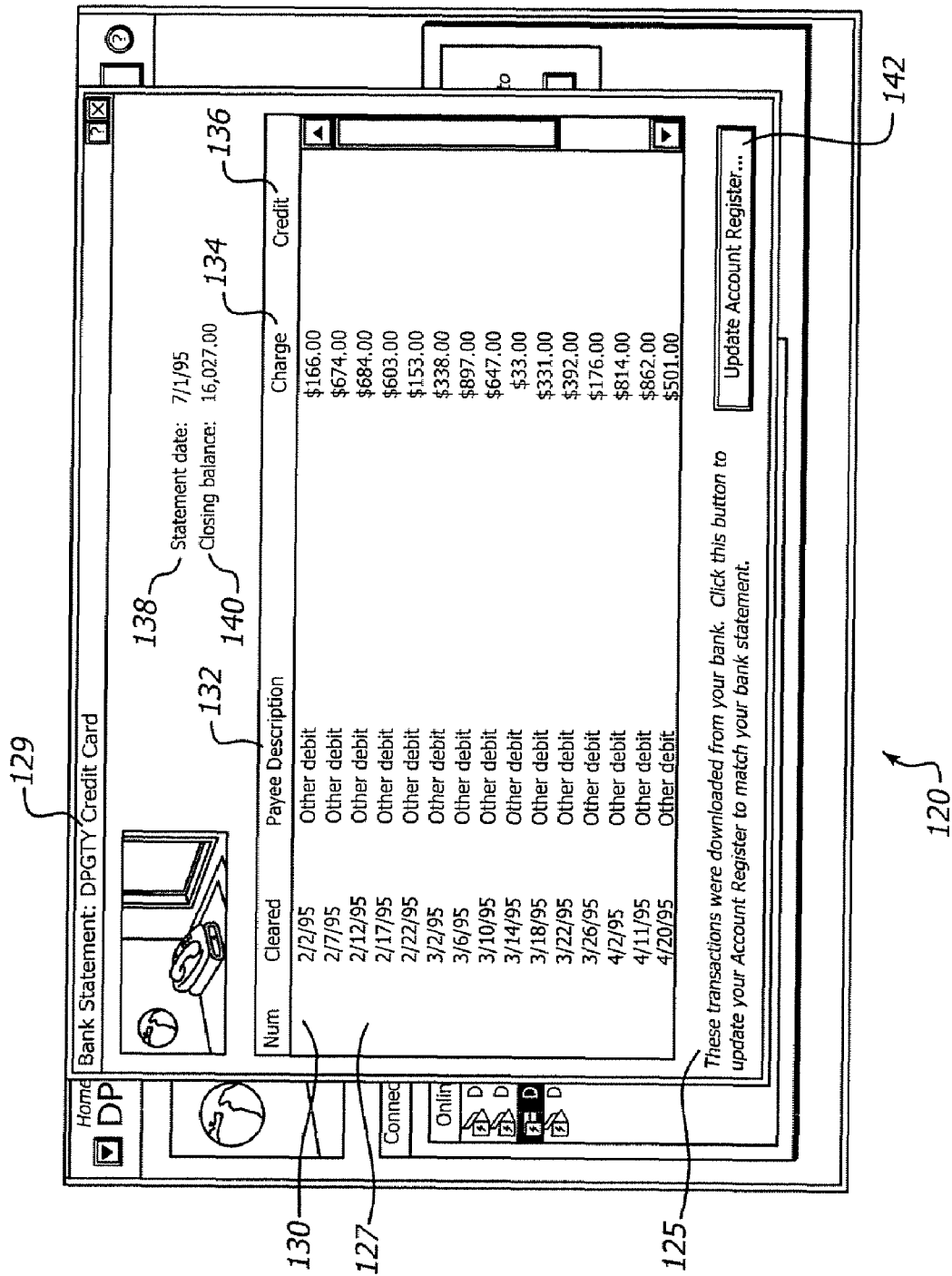
FIG. 5 is a screen display illustrating a financial statement window in accordance with the exemplary embodiment of the present invention.

Now turning to FIG. 4, a screen display depicting selection of the Statements tab 107b will now be described. The statements tab 107b contains a list of bank accounts 109a, an on-line financial statement 109b for each account, the number of transactions 109c for each on-line financial statement, and a current balance 109d for each account. To view an on-line financial statement, first the user selects one of the listed bank accounts using the mouse 42. The desired bank account is highlighted on the home banking display screen 120. For example, the user can select DPGTY Credit Card 112. Next, the user selects a Read Statement button 110 located on the right side of the home banking display screen 120 using the mouse 42. The Read Statement button 110 allows the user to view the selected on-line financial statement on the home banking display screen 120. Once the Read Statement button 110 is selected, a financial statement window is displayed on top of the home banking display screen 120, as shown in FIG. 5.

Now referring to FIG. 5, a screen display illustrating a financial statement window in accordance with the exemplary embodiment of the present invention will be described. The financial statement window 125 contains a list of all of the transactions 127 that were downloaded from the on-line banking service associated with the selected bank account 129. In this case, the transactions 127 associated with the DPGTY Credit Card account 129 are displayed in the financial statement window 125. The on-line financial statement includes information such as the date 130 of each transaction, the payee name 132, the charge 134 or credit 136, the statement date 138, and the closing balance 140. The information in the on-line financial statement comes directly from the on-line banking service and cannot be changed when presented in this format. For example, the payee name 132 for each transaction is "Other debit" and will always bear this payee name each time the on-line financial statement is downloaded from the on-line banking service. However, the user may desire to change the payee name when viewing the list of transactions on an individual basis. This process will be described in greater detail below with respect to FIGS. 6a-6d.

Figure 6A:
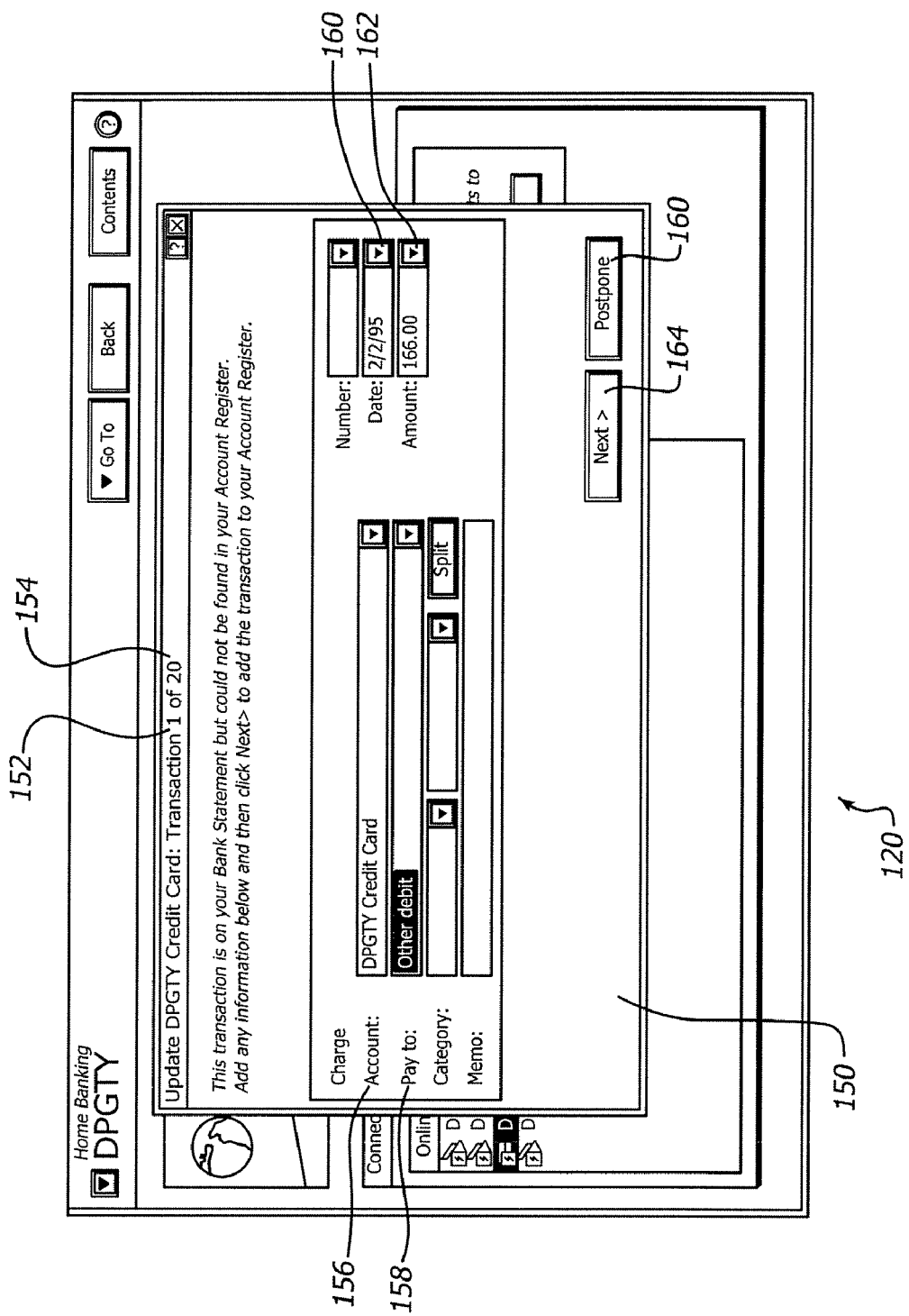
FIG. 6a is a screen display illustrating an update dialog box in accordance with the exemplary embodiment of the present invention.

Referring back to FIG. 5, after viewing the on-line financial statement, the user may want to update the user's file by incorporating the data from the on-line financial statement. To update the user's file, the user selects an Update Account Register button 142 located in the lower right corner of the financial statement window 125. The Update Account Register button 142 allows the user to view the transactions 127 listed in the financial statement window 125 on an individual basis. To do so, the user clicks on the Update Account Register button 142 using the mouse 42. Once the Update Account Register button 142 is selected, the financial statement window 125 is no longer displayed, and an update dialog box 150 is displayed on top of the home banking display screen 120, as illustrated by FIG. 6a.

With continuing reference to FIGS. 1-5 and now turning to FIGS. 6a-6d, the update dialog box 150 will now be described. In FIG. 6a, the update dialog box 150 displays one transaction at a time for downloading into the user's file. The update dialog box 150 contains a transaction number indicator 152 to keep track of which transaction is being displayed and a total number of transactions 154 for the financial statement. In this example, transaction 1 of 20 is displayed. The update dialog box 150 also contains a name of the charge account 156, a payee name 158 for the transaction, a date 160 for the transaction, and an amount 162 of the transaction.

The user typically reviews each transaction for accuracy. If a transaction is accurate and does not already appear in the user's file, the user then decides whether to download the transaction or postpone downloading the transaction into the user's file. To postpone downloading transactions, the user can select a Postpone button 166 using the mouse 42. Once the Postpone button 166 is selected the downloading process is terminated, the update dialog box 150 is no longer displayed, and the home banking display screen 120 returns to the forefront on the monitor 47 of the computer 20, as shown in FIG. 4. On the other hand, to download the transaction into the user's file, the user can select a Next button 164 using the mouse 42. Once the transaction is downloaded into the user's file, the next transaction will be displayed in the update dialog box 150, as shown in FIG. 6b.

Figure 6B:
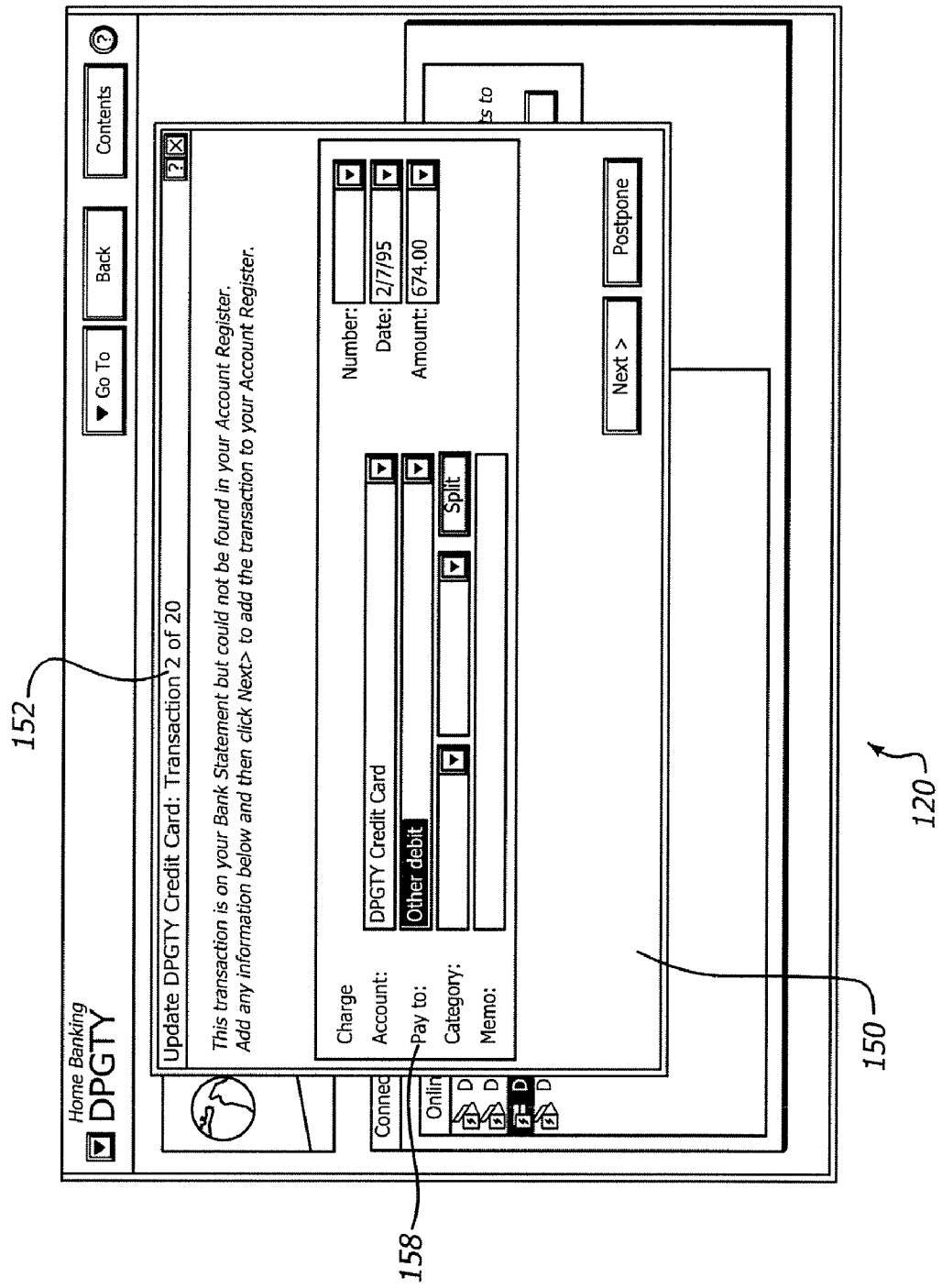
FIG. 6b is a screen display illustrating an advancement to a second transaction after selection of a Next button in accordance with the exemplary embodiment of the present invention.

Now referring to FIG. 6b, a screen display illustrating advancement to the next transaction after selection of a Next button is shown in an update dialog box. In FIG. 6b, the update dialog box 150 is displayed on top of the home banking display screen 120, as previously described with respect to FIG. 6a. In this example, the transaction number indicator 152 indicates that the displayed transaction is now transaction 2 of 20. In transaction 2, the date and amount of the transaction is different from the date and amount of transaction 1. (FIG. 6a) Of particular importance to this discussion is the payee name 158 for the transaction. In this example, the payee name 158 is "Other debit", which is the same payee name as the payee name in transaction 1.

Referring back to FIG. 6b, the user may decide to change the payee name to a name that the user prefers. For example, the user may decide to change the name "Other debit" to "Veda" so that the user can keep up with all charges to "Other debit" under a name that is more meaningful to the user. Changing the payee name is accomplished by selecting the payee name that the user wants to change using the mouse 42. In this example, the user wants to change <Other debit> 158. The user clicks the mouse 42 on "Other debit" 158. Once the user clicks the mouse 42 on the payee name, the payee name is highlighted.

Figure 6C:
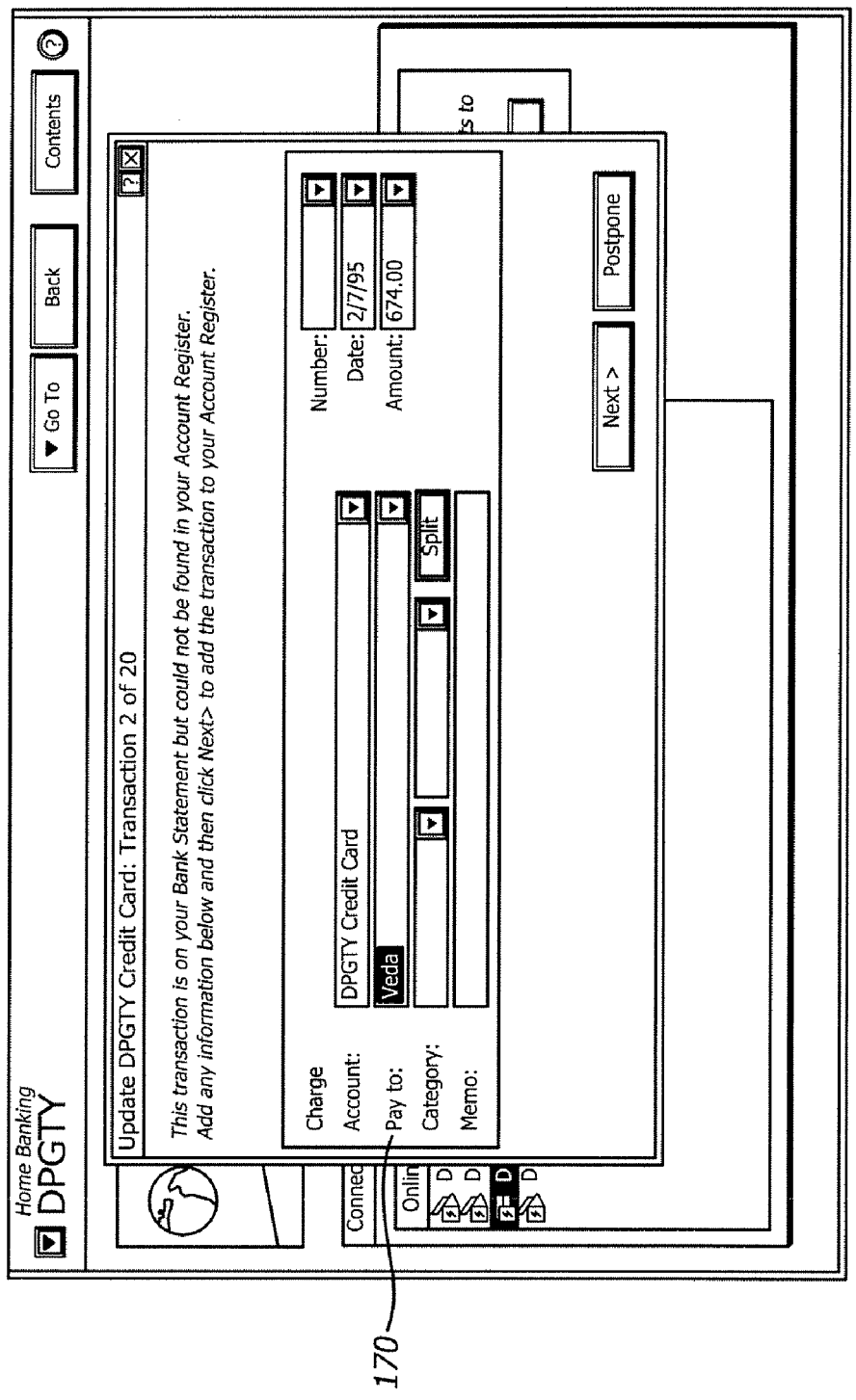
FIG. 6c is a screen display illustrating a change from the name "Other debit" to "Veda" in accordance with the exemplary embodiment of the present invention.

Referring to FIG. 6c, the user simply enters the name <Veda> in the space provided next to the phrase "Pay to:" using the keyboard 40. Once the new name 170 is entered, the payee name change is displayed. Each time the original payee name occurs within the dialog box showing individual transactions, the preferred payee name is automatically substituted for the original payee name without user interaction. The change occurs "behind the scenes" for all occurrences of the original payee name, and the user only sees the preferred payee name in the individual transactions.

Figure 6D:
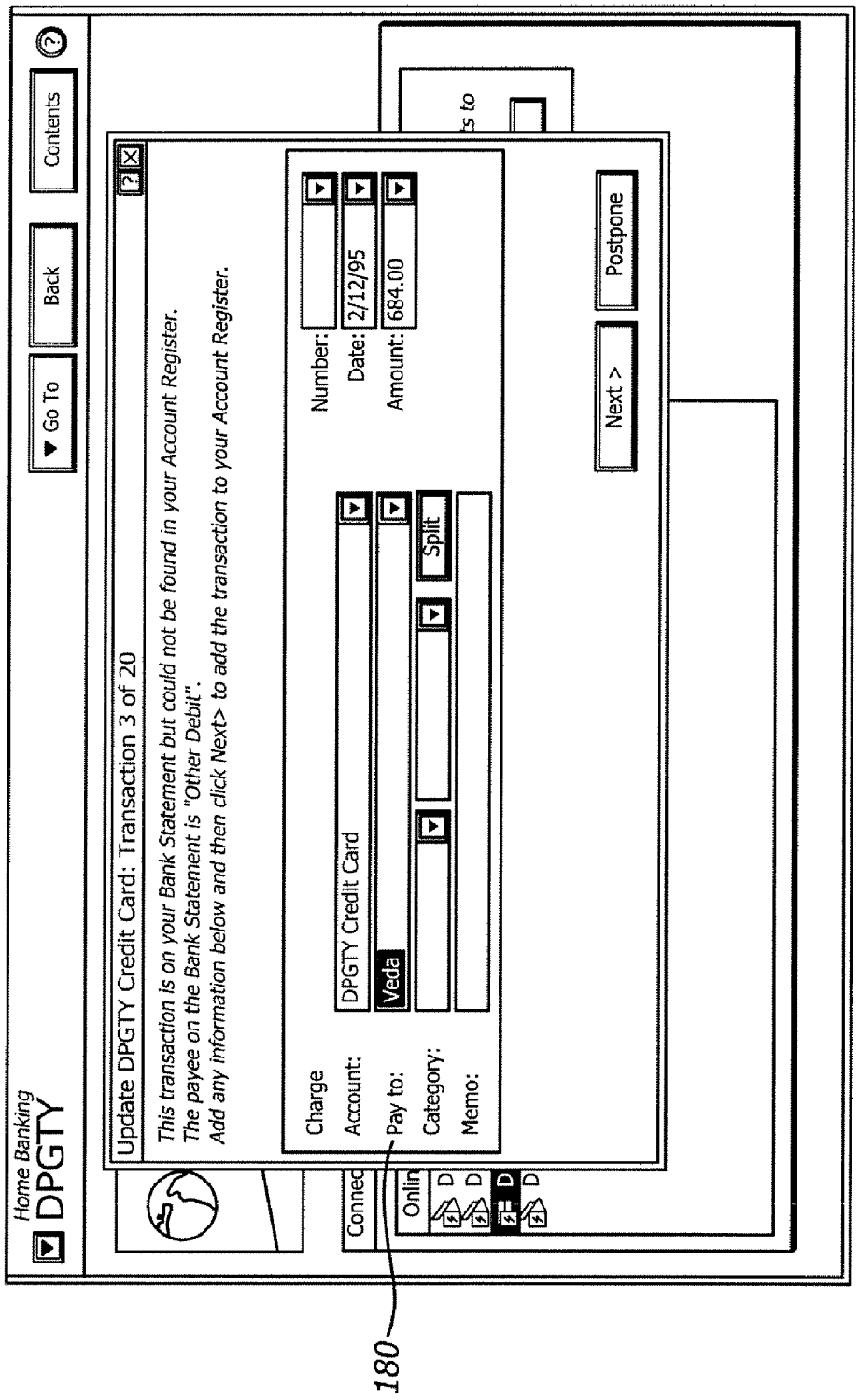
FIG. 6d is a screen display illustrating an automatic substitution of an original payee name to a preferred payee name in a third transaction in accordance with the exemplary embodiment of the present invention.

For example, referring to FIG. 6d, the payee name for transaction indicator 182 (3 of 20) already has a payee name "Veda" 180. If a comparison is made between this payee name (FIG. 6d) and the third payee name in the list in FIG. 5, it is noted that while "Other debit" appears in the list (FIG. 5), it has been automatically substituted by "Veda" in the individual transaction (FIG. 6d). However, this substitution does not occur in the on-line financial statement. That is, whenever the user downloads the on-line financial statement from the on-line banking service, the payee names will be the original payee names provided by the bank and never the preferred payee names chosen by the user.

To reiterate, FIGS. 2-6d represent a typical environment for using the ACPN feature. Once a payee name is changed, this information is stored in the memory of the preferred program module memory. Each time the old or original payee name occurs within the dialog box showing individual transactions, the new or preferred payee name is automatically substituted for original payee without user interaction. This process is performed "behind the scenes" within the ACPN feature, and the user never sees the original payee name displayed again, with one exception. Before the user downloads data in the user's file from an on-line banking service, the user will initially see the original payee names. However, once the user downloads the data from the on-line service into the user's file, the preferred payee names will automatically appear for each transaction without user interaction.

Now turning to FIGS. 7-10, implementation of the data structure and user interface for the ACPN feature will be described in greater detail. The environment described herein and for the remainder of the discussion involves connection to an on-line banking service and use of an on-line financial statement provided by the on-line banking service.

Figure 7:
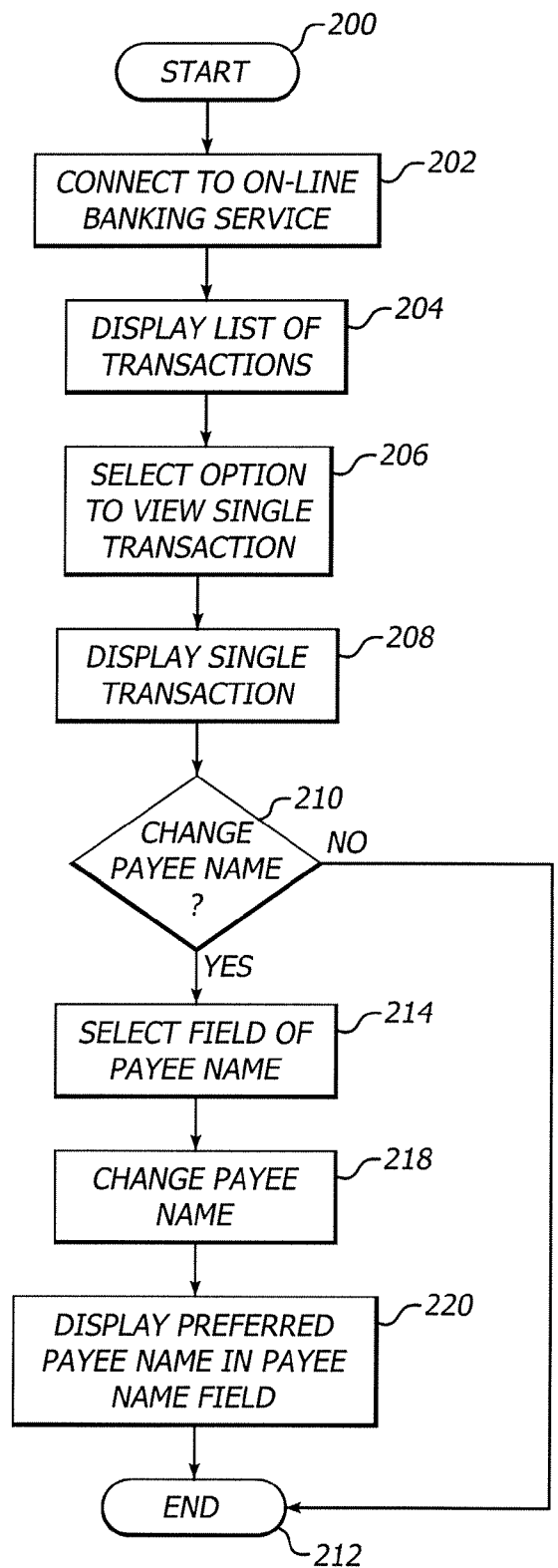
FIG. 7 is a flow diagram illustrating the steps that a user follows to change an original payee name to a preferred payee name in accordance with the exemplary embodiment of the present invention.

FIG. 7 is a flow diagram that illustrates the steps that a user follows to change an original payee name to a preferred payee name in accordance with the exemplary embodiment of the present invention. The process begins at the START step 200 by turning on the computer 20 and selecting the preferred program module for supporting the computer-implemented process for changing a payee name.

In step 202, a connection is made to an on-line banking service via modem 54. A list of all the transactions is then displayed in step 204. In step 206, an option to view a single transaction is selected. The single transaction is then displayed in step 208. Next, a determination is made, in step 210, as to whether there is a desire to change the payee name provided in the transaction. If there is a desire to change the payee name, the "YES" branch is followed to step 214; otherwise, the "NO" branch is followed to the END step 212. In step 214, the payee name field is selected by clicking the mouse 42 on the payee name field. Next, in step 218, the payee name is changed to a preferred payee name in response to user-provided input. The preferred payee name is then displayed in the payee name field in step 220. The payee name change process terminates at the END step 212.

The process of changing an original payee name to a preferred payee name is implemented in a one-to-one mapping arrangement by using linking mechanisms. Each time the user changes a payee name, a link is either created, changed, or eliminated. With respect to the ACPN feature, links serve dual purposes. One purpose of a link is to map the original payee name to the preferred payee name so that the link can be followed from the original payee name to the preferred payee name. A second purpose of a link is to act as a flag for the original payee name. This second purpose will be described in greater detail later with respect to FIG. 9. In essence, the preferred program module is capable of automatically managing links by internally determining when a link should be created, changed, or eliminated in response to user-provided input. It will be appreciated by one skilled in the art that the management of links is not limited to use with financial transactions, in general, and payee names, in particular, but can also apply to any action or transaction requiring links between one field and another field.

Figure 8:
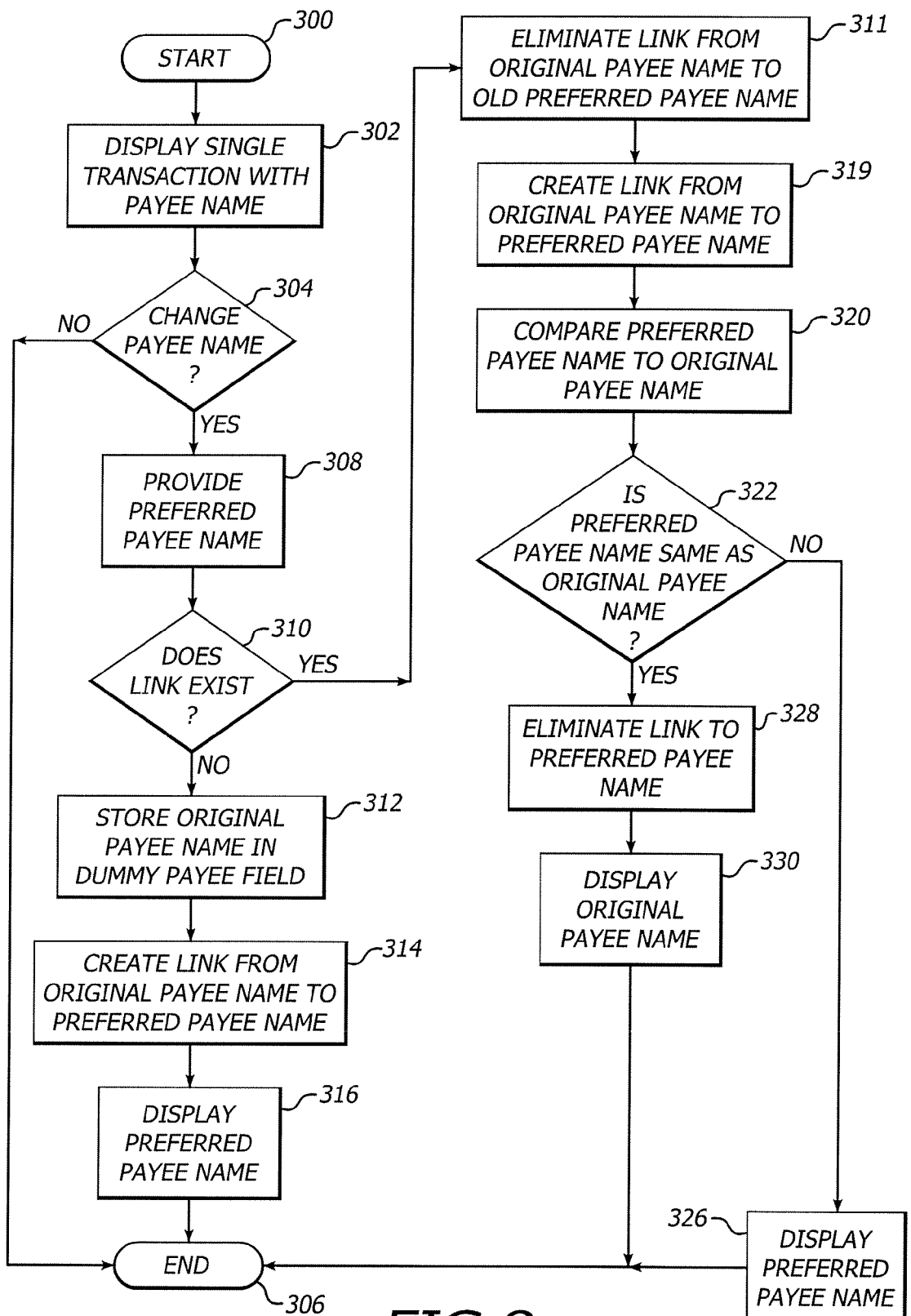
FIG. 8 is a flow diagram illustrating the steps for managing links in response to user-provided input in accordance with the exemplary embodiment of the present invention.

Referring to FIG. 8, the method by which the computer manages links during the payee name changing process will now be described. FIG. 8 is a flow diagram illustrating the steps for automatically creating, changing, and eliminating links in response to a user changing a payee name. At the START step 300, the computer parameters are initialized, the preferred application program is selected, and the on-line banking service is connected via modem 54.

A single transaction is displayed in step 302, in response to user-provided input. A determination is made as to whether there is a desire to change the payee name as displayed in the transaction, in step 304. If there is a desire to change the payee name, the "YES" branch is followed to step 308; otherwise, the "NO" branch is followed to the END step 306. In step 308, the preferred payee name is provided by the user according to the method described with respect to FIG. 7.

After the name is provided, a determination is made, in step 310, as to whether a link currently exists with respect to the payee name that the bank had originally provided. If a link already exists between the original payee name and an old preferred payee name, the "YES" branch is followed to step 311; otherwise, the "NO" branch is followed to step 312. In step 311, the link that already exists between the original payee name and the old preferred payee name is eliminated. In step 319, a link is created from the original payee name to the preferred payee name, which is now the new preferred payee name. In step 320, a comparison is made between the preferred payee name and the original payee name. Next, a determination is made, in step 322, as to whether the preferred payee name is the same as the original payee name. If the payee names are the same, the "YES" branch is followed to step 328; otherwise, the "NO" branch is followed to step 326. In step 328, the link from the original payee name to the preferred payee name is eliminated. Once the link is eliminated, the original payee name is displayed in step 330. The process terminates at the END step 306. If the payee names are not the same, in step 326', the preferred payee name is displayed on the display screen. The process then terminates at the END step 306.

If a link does not currently exist with respect to the original payee name, the original payee name is then stored in a dummy payee field in step 312. Dummy payee fields will be described in greater detail below with respect to FIG. 9. Referring back to FIG. 8, in step 314, a link is created from the original payee name to the preferred payee name. The preferred payee name is then displayed on the display screen in step 316. The process terminates at the END step 306.

Figure 9:
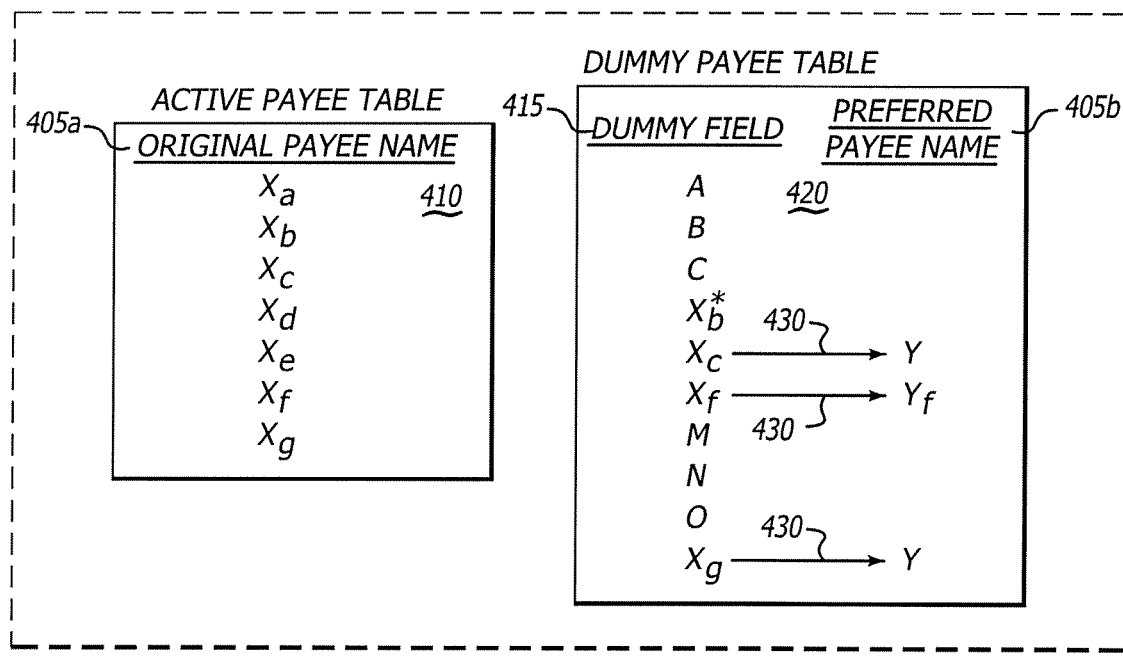
FIG. 9 is a diagram illustrating the data structure for the automatically correct payee name feature containing a dummy payee table and an active payee table in accordance with the exemplary embodiment of the present invention.

Now turning to FIG. 9, a diagram illustrating the data structure for automatically correct payee containing a dummy payee table and an active payee table are shown in accordance with the exemplary embodiment of the present invention. In FIG. 9, the data structure 400 is designed to manage the ACPN feature. The active payee table 410 contains all of the active payee name field parameters 405a. In this case, the field parameters are all originating payee names 405a—i.e. Xa, Xb, Xc, Xd, Xe, Xf, and Xg. The dummy payee table 420 contains in a dummy field 415, all deleted payee names (A, B, C, Xb*, M, N, and O) and the active payee names having links 430 (Xc, Xf, and Xg) to preferred payee names 405b (Y, Yg). When an original payee name 405a is changed by the user, in a manner previously described, the original payee name 405a is automatically stored in the dummy field 415 and a link 430 is created to point to the preferred payee name 405b. The link 430 also serves as a flag indicating that the field parameter in the dummy field 415 is special and should not be erased during a database clean-up.

Before an individual transaction is displayed, the dummy payee table 420 is searched first to find an exact match for the original payee name in the transaction. If an exact match is found, the program module looks for the link or flag 430. If there is a link 430, the program module follows that link 430 to the preferred payee name 405b and displays it. For example, suppose the original payee name in the transaction is Xf. In this example, Xf is found in the dummy payee table 420, Xf has a link 430, and Xf points to the preferred payee name 405b, Yf. Therefore, Yf is automatically displayed in the individual transaction.

If an exact match is found in the dummy payee table 420, but the match does not have a flag or link 430, or if an exact match is not found in the dummy payee table 420, then the active payee table 410 is searched next to find an exact match. If an exact match is found, the original payee name is displayed. However, if an exact match is not found, the original payee name is first displayed in the individual transaction and once accepted by the user, the original payee name is then added to the active payee table 410. A more concise description of the single transaction display process is provided below with respect to FIG. 10.

Figure 10:
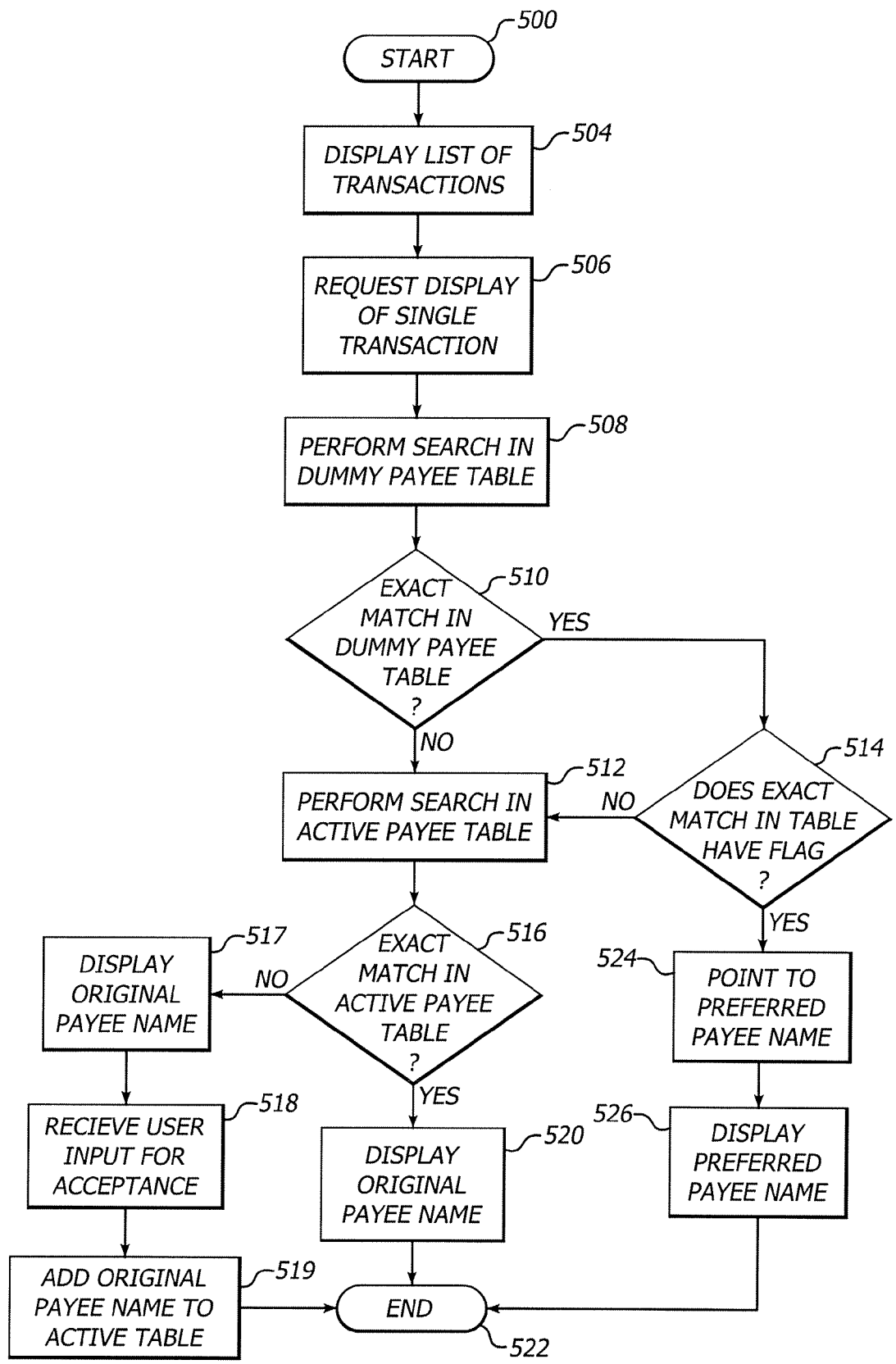
FIG. 10 is a flow diagram illustrating the steps taken before displaying a single transaction in accordance with the exemplary embodiment of the present invention.

Referring now to FIG. 10, a method by which a computer automatically displays a single transaction in response to user-provided input is provided in accordance with the exemplary embodiment of the present invention. FIG. 10 is a flow diagram illustrating the steps performed by a computer 20 to display a single transaction. At the START step 500, the computer parameters are initialized, the preferred application program is selected, and the on-line banking service is connected via modem 54.

A list of all transactions is displayed in step 504. A selection is made, in step 506, requesting the display of a single transaction. In step 508, a dummy payee table search is performed to find an exact match for an original payee name associated with a specific transaction. Next, a determination is made as to whether an exact match is located in the dummy payee table in step 510. If an exact match is located, the "YES" branch is followed to step 514; otherwise, the "NO" branch is followed to step 512. In step 514, a determination is made as to whether the matched payee name has a flag. If so, the "YES" branch is followed to step 524; otherwise, the "NO" branch is followed to step 512. In step 524, the matched payee name in the dummy payee table points to a preferred payee name. Next, the preferred payee name is displayed in the single transaction in step 526. The process terminates at the END step 522.

If an exact match is not located in the dummy payee table or the matched payee name from the dummy payee table does not have a flag, then an active payee table search is performed to find an exact match for the original payee name in step 512. In step 516, a determination is made as to whether an exact match of the original payee name is located in the active payee table. If so, the "YES" branch is followed to step 520; otherwise, the "NO" branch is followed to step 517. In step 520, the original payee name is displayed in the single transaction. The display process terminates at the END step 522.

If the active payee table does not contain an exact match of the original payee name, the original payee name is displayed on the display screen in the single transaction in step 517. Next, in step 518, user-provided input is received accepting the transaction. The original payee name is then added to the active payee table in step 519. The display process terminates at the END step 522.

In summary, the ACPN feature represents an exemplary embodiment of the present invention. The APCN feature is designed to automatically rename parameters presented within a field of a display screen, such as substituting payees from the assigned bank payee name (original payee name) to a payee name the user prefers (preferred payee name). The ACPN feature is designed such that it automatically creates, deletes or changes a link whenever the user changes a field parameter, in this case the payee name, in the payee name field. When the original payee name is a part of a transaction or appears elsewhere within the framework of the preferred program module, the link points to the preferred payee name. Consequently, the preferred payee name is automatically displayed, thereby replacing the original payee name without presenting the original payee name within the display screen field.

Another embodiment of the present invention provides a system for managing a link between field parameters within a field for a transaction, and thereafter displaying one of the field parameters based on the creation or elimination of the link. A first field parameter is changed to a third field parameter within the field. A determination is made as to whether the first field parameter already has a link to a second field parameter. If the first field parameter does not already have a linking mechanism, then a link is created from the first field parameter to the third field parameter, and the third field parameter is displayed. However, if the first field parameter already has a link to the second field parameter, then the link from the first field parameter to the second field parameter is eliminated, and a link from said first field parameter to the third field parameter is created. A determination is then made as to whether the first field parameter is the same as the third field parameter. If the first field parameter is not the same as the third field parameter, then the third field parameter is displayed. On the other hand, if the first field parameter is the same as the third field parameter, then the link between the first field parameter and the third field parameter is eliminated, the third field parameter is deleted, and therefore, the first field parameter is displayed.

Maintenance of changes in field parameters can be performed within a data structure by utilizing linking mechanisms. The data structure can be used for managing the display of a first field parameter or a second field parameter on a display device, and comprises a dummy table and an active table. The dummy table located in the data structure contains a plurality of field parameters, wherein at least two of the field parameters are linked together with a link. A first determination is made as to whether the first field parameter is located in the dummy table. If so, then a second determination is made as to whether the first field parameter in the dummy table has a link, wherein the link is located between the first field parameter and the second field parameter. If a link is found, then the link is used to point to the second field parameter, and the second field parameter is provided for display on the display device. However, if the first field parameter is not located in the dummy table or the first field parameter is located in the dummy table but does not have the link between the first field parameter and the second field parameter, then a third determination is made as to whether the first field parameter is located in the active table located in the data structure, wherein the active table contains a plurality of field parameters. If the first field parameter is located in the active table, then the first field parameter is provided for display on the display device. On the other hand, if the first field parameter is not located in the active table, then the first field parameter is displayed on the display device before the first field parameter is added to the active table.

Automated Balance Adjustment (ABA)

In another embodiment of the present invention, a method is provided for reconciling an ending balance in a user's file with an on-line financial statement provided by an on-line banking service. Implementation-wise, it is necessary to correct an opening balance in the user's file so that downloaded transactions provide an ending balance in the user's file that is consistent with the ending balance in the on-line financial statement.

Transactions in the user's file and in the on-line financial statement are categorized by date. These dates are used to determine whether an opening balance in the user's file has to be corrected. Generally described, the test for making this determination is as follows: if (1) the earliest transaction date in an on-line financial statement is earlier than or the same as the earliest transaction date in the user's file and (2) there have been no downloaded transactions from the on-line financial statement into the user's file from the closing period of the on-line financial statement up to the earliest dated transaction in the user's file, then the opening balance has to be corrected to reconcile the ending balance. In other words, if either (1) or (2) is responded to negatively, then the opening balance does not have to be corrected and the ending balance in the user's file is fine. This process of reconciling ending balances is described in greater detail below with respect to FIG. 12.

In cases where the opening balance has to be corrected, the following formula (A) is used to calculate the correct opening balance.

$$OB=EB-(T+Tn+\ldots+Tn+1). \quad (A)$$

Where,

OB represents the opening balance of the user's file;

EB represents the ending balance of the on-line financial statement; and $(T+Tn+\ldots+Tn+1)$ represents the sum of all transactions in the on-line financial statement.

Once the opening balance is corrected, a prompt is displayed to inform the user that the opening balance has been corrected.

This process is automatically performed each time the user chooses an option to download data from an on-line banking service into the personal data store. The advantage of the ABA feature is that the user no longer has to worry about the task of maintaining an accurate ending balance, because the ABA feature automatically performs this function for the user.

Now turning to FIGS. 11 and 12, the user interface and computer-implemented processes for automatic balance adjustment will be described.

Figure 11:
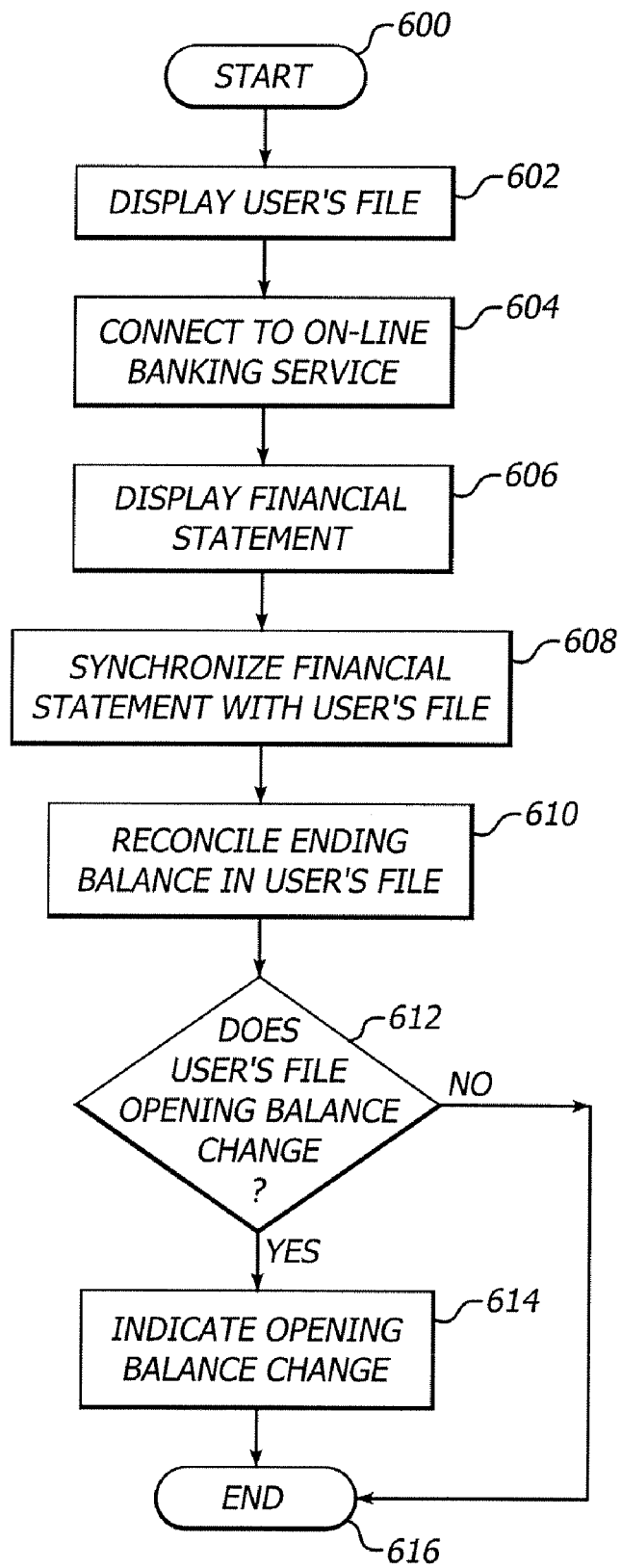
FIG. 11 is a flow diagram illustrating the steps that a user follows to reconcile an ending balance in a personal data store in accordance with the exemplary embodiment of the present invention.
Figure 12:
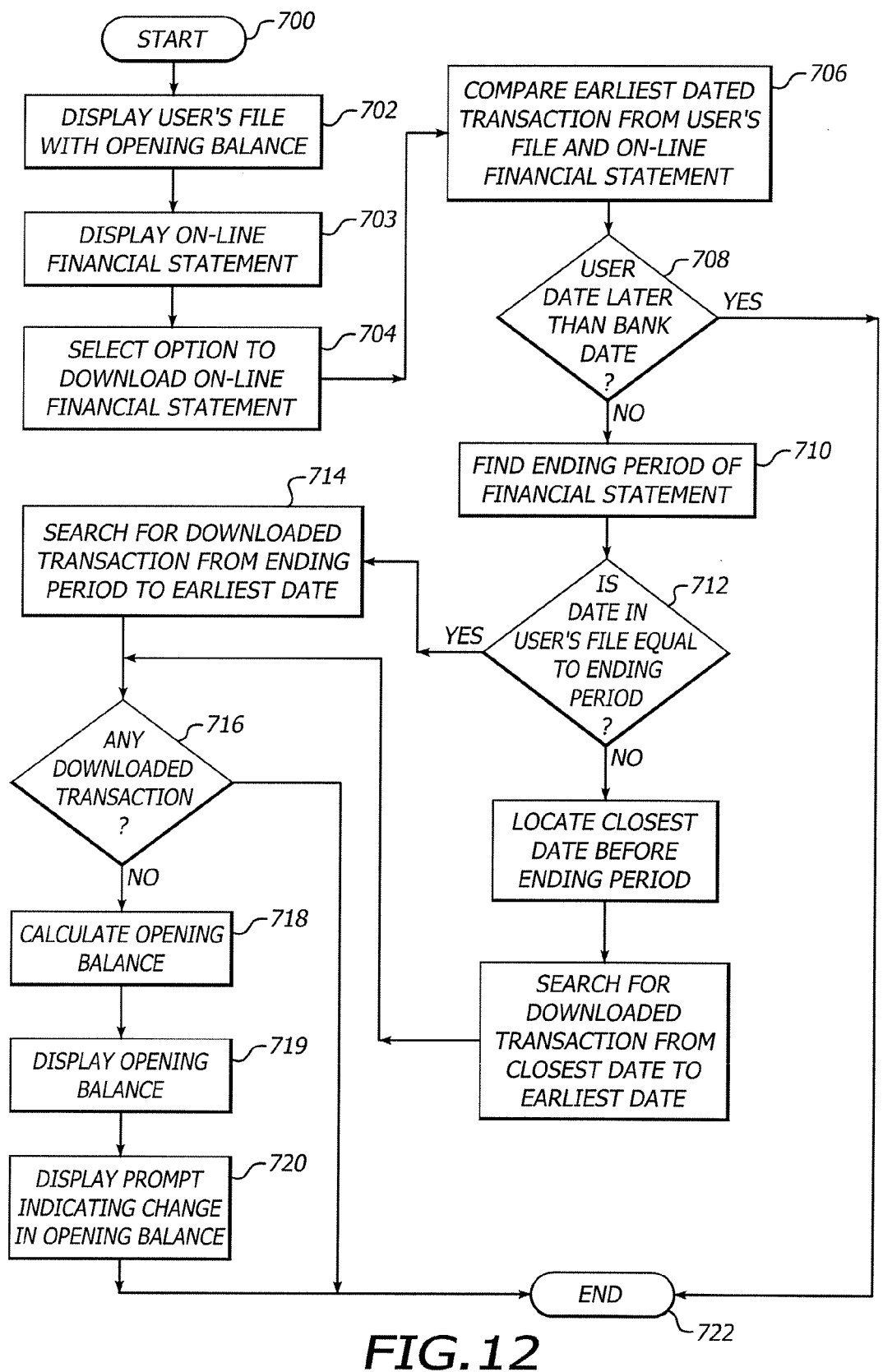
FIG. 12 is a flow diagram illustrating the steps taken to determine when to calculate an opening balance in accordance with the exemplary embodiment of the present invention.

Referring to FIG. 11, a flow diagram illustrating the steps required for reconciling an ending balance in a user's file is provided in accordance with the exemplary embodiment of the present invention. At the START step 600, the computer parameters are initialized and the preferred application program is selected.

In step 602, the user's file is displayed. Next, in step 604, a connection is made to the on-line banking service via modem 54. Once the connection is made, in step 606, a financial statement from the on-line banking service is displayed. In step 608, an option to synchronize the information in the user's file with the data from the on-line financial statement is selected. Once this option is selected, the ending balance is automatically reconciled, in step 610. Next, in step 612, a determination is made as to whether the opening balance in the user's file has changed after the ending balance has been reconciled. If the opening balance has changed, the "YES" branch is followed to step 614; otherwise, the "NO" branch is followed to the END step 616. In step 614, a prompt appears on the display screen indicating that the opening balance in the user's file has changed. The process terminates at the END step 616.

Now turning to FIG. 12, the method by which a computer 20 automatically adjusts an opening balance in a user's file to produce an accurate ending balance will now be described. FIG. 12 is a flow diagram of the steps involved for automatic balance adjustment in accordance with the exemplary embodiment of the present invention. At the START step 700, the computer parameters are initialized, the preferred application program is selected, and an on-line banking service is connected via modem 54.

The user's file having an opening balance is displayed on the display screen of the monitor 47, in step 702. In step 703, an on-line financial statement is displayed on the display screen of the monitor 47. Next, in step 704, an option is selected for downloading the on-line financial statement into the user's file. After downloading the on-line financial statement, but prior to entering transactions into the user's file, the earliest dated transaction from the on-line financial statement is compared to the earliest dated transaction from the user's file, in step 706. Next, in step 708, a determination is made as to whether the earliest dated transaction from the user's file is later than the earliest dated transaction from the on-line financial statement. If so, the "YES" branch is followed to the END step 722; otherwise, the "NO" branch is followed to step 710.

In step 710, the ending period of the on-line financial statement is located. Next, in step 712, a determination is made as to whether there is a transaction date from the user's file that has the same date as the ending period of the on-line financial statement. If so, the "YES" branch is followed to step 714; otherwise, the "NO" branch is followed to step 713. In step 714, the user's file is searched backwards from the transaction date that is the same as the ending period of the on-line financial statement to the earliest dated transaction in the user's file. During the search, a determination is made, in step 716, as to whether there are any downloaded transactions already in the user's file. Downloaded transactions are identified with a flag to distinguish them from other transactions. If so, the "YES" branch is followed to the END step 722; otherwise, the "NO" branch is followed to step 718. In step 718, a new opening balance is calculated for the user's file.

The new opening balance is then displayed in the user's file in step 719. Next, in step 720, a prompt indicating that the opening balance has changed is displayed. The process terminates at the END step 722.

If there is no transaction from the user's file that has the same date as the ending period of the on-line financial statement, in step 713, a transaction date from the user's file that is closest to, but earlier than, the ending period of the on-line financial statement is located. Next, in step 715, the user's file is searched backwards from the transaction date located in the previous step 713 to the earliest dated transaction in the user's file. During the search, a determination is made, in step 716, as to whether there are any downloaded transactions already in the user's file. If so, the "YES" branch is followed to the END step 722; otherwise, the "NO" branch is followed to step 718. In step 718, a new opening balance is calculated for the user's file. The new opening balance is then displayed in the user's file in step 719. Next, in step 720, a prompt is displayed indicating that the opening balance has changed. The process terminates at the END step 722.

In summary, the ABA feature automatically reconciles an ending balance derived from a user's file or personal data store with an ending balance derived from an on-line banking service before downloading data from the on-line banking service by correcting the opening balance of the user's file.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for automatically substituting payee names received from the electronic transfer of financial data when displayed in a personal financial management program, comprising the steps of:

receiving an electronic financial statement transmitted from a financial services provider, wherein the electronic financial statement comprises one or more transaction entries, each transaction entry comprising an original payee name used by the financial services provider in the electronic financial statement and a transaction amount;

receiving a user command associating the original payee name with a preferred payee name assigned by a user for use in the personal financial management program;

creating a data structure that comprises a dummy payee table comprising a dummy field;

moving the original payee name to the dummy field;

associating the original payee name in the dummy field to the preferred payee name in the dummy field and indicating an assignment of the preferred payee name;

selecting an individual transaction for display, searching the dummy payee table to determine if there exists a match for the original payee name that indicates the assignment of the preferred payee name;

upon determining there exists a match in the dummy payee table for the original payee name and the assignment of the preferred payee name, automatically displaying the preferred payee name of the associated original payee name instead of the associated original payee name in the electronic financial statement listing the associated original payee name; and upon determining there does not exist a match, searching an active payee table to locate and display an original payee name.

2. The method of claim 1, further comprising the step of reconciling an ending balance in the financial statement with an opening balance in a personal data store by:

comparing an earliest dated transaction in a personal data store to an earliest dated transaction in the financial statement to determine whether the earliest dated transaction in the personal data store is later than the earliest dated transaction in the financial statement;

if an earliest dated transaction in a personal data store is not later than an earliest dated transaction in the financial statement, then determining whether any of the transactions of the financial statement have been downloaded into the personal data store;

if none of the transactions of the financial statement have been downloaded into the personal data store, then calculating a correct beginning balance that is different from the opening balance in the personal data store; and displaying the correct beginning balance.

3. The method of claim 2 further comprising the step of displaying a prompt indicating that the opening balance has changed to the correct beginning balance in the personal data store.

4. The method of claim 2, wherein the step of determining whether any of the transactions of the financial statement have been downloaded into the personal data store comprises the steps of:

comparing the ending balance in the financial statement to the transactions in the personal data store to determine whether any transaction date in the personal data store is the same as an ending period of the financial statement;

if so, then identifying any of the transactions of the financial statement having the same date as the transactions in the personal data store; and if none of the transaction dates in the personal data store are the same as the ending period of the financial statement, then locating a closest transaction date in the personal data store that occurs before the ending period of the financial statement and identifying any of the transactions of the financial statement having one of the transaction dates in a range extending between the closest transaction date in the personal data store and an earliest dated transaction in the personal data store.

5. The method of claim 4, further comprising the steps of:

downloading the transactions of the financial statement into the personal data store; and marking the downloaded transactions with a flag to indicate those transactions in the personal data store that have been downloaded from the financial statement.

6. A computer system configured to automatically substitute payee names received from the electronic transfer of financial data when displayed in personal financial management program by performing the steps of:

receiving an electronic financial statement transmitted from a financial services provider, wherein the electronic financial statement comprises one or more transaction entries, each transaction entry comprising an original payee name used by the financial services provider in the electronic financial statement and a transaction amount;

receiving a user command associating the original received payee name with a preferred payee name assigned by a user for use in the personal financial management program;

creating a data structure that comprises a dummy payee table comprising a dummy field;

moving the original payee name to the dummy field;

associating the original payee name in the dummy field to the preferred payee name in the dummy field and indicating an assignment of the preferred payee name;

selecting an individual transaction for display, searching the dummy payee table to determine if there exists a match for the original payee name that indicates the assignment of the preferred payee name;

upon determining there exists a match in the dummy payee table for the original payee name and the assignment of the preferred payee name, automatically displaying the preferred payee name of the associated original payee name instead of the associated original payee name when the user accesses an individual transaction in the electronic financial statement listing the associated original payee name; and upon determining there does not exist a match, searching an active payee table to locate and display an original payee name.

7. The computer system of claim 6, further configured to perform the step of reconciling an ending balance in the first financial statement with an opening balance in a personal data store by:

comparing the earliest dated transaction in the personal data store to the earliest dated transaction in the financial statement to determine whether the earliest dated transaction in the personal data store is later than the earliest dated transaction in the financial statement;

if the earliest dated transaction in the personal data store is not later than the earliest dated transaction in the financial statement, then determining whether any of the transactions of the financial statement have been downloaded into the personal data store;

if none of the transactions of the financial statement have been downloaded into the personal data store, then calculating a correct beginning balance that is different from the opening balance in the personal data store; and displaying the correct beginning balance.

8. The computer system of claim 7, further configured to perform the step of displaying a prompt indicating that the opening balance has changed to the correct beginning balance in the personal data store.

9. The computer system of claim 7, further configured to perform the step of determining whether any of the transactions of the financial statement have been downloaded into the personal data store by:

comparing the ending balance in the financial statement to the transactions in the personal data store to determine whether any transaction date in the personal data store is the same as the ending period of the financial statement;

if so, then identifying any of the transactions of the financial statement having the same date as the transactions in the personal data store;

and if none of the transaction dates in the personal data store are the same as the ending period of the financial statement, then locating the closest transaction date in the personal data store that occurs before the ending period of the financial statement and identifying any of the transactions of the financial statement having one of the transaction dates in a range extending between the closest transaction date in the personal data store and the earliest dated transaction in the personal data store.

10. The computer system of claim 9, further configured to perform the steps of:

downloading the transactions of the financial statement into the personal data store; and marking the downloaded transactions with a flag to indicate those transactions in the personal data store that have been downloaded from the financial statement.

11. A computer-readable medium on which is stored a computer program comprising instructions which, when executed by a computer, perform the steps of:

receiving an electronic financial statement transmitted from a financial services provider, wherein the electronic financial statement comprises one or more transaction entries, each transaction entry comprising an original payee name used by the financial services provider in the electronic financial statement and a transaction amount;

receiving a user command associating the original payee name with a preferred payee name assigned by a user for use in the personal financial management program;

creating a data structure that comprises a dummy payee table comprising a dummy field;

moving the original payee name to the dummy field;

associating the original payee name in the dummy field to the preferred payee name in the dummy field and indicating an assignment of the preferred payee name;

selecting an individual transaction for display, searching the dummy payee table to determine if there exists a match for the original payee name that indicates the assignment of the preferred payee name; and;

upon determining there exists a match in the dummy payee table for the original payee name and the assignment of the preferred payee name, automatically displaying the preferred payee name of the associated original payee name instead of the associated original payee name when the user accesses an individual transaction in the electronic financial statement listing the associated original payee name; and upon determining there does not exist a match, searching an active payee table to locate and display an original payee name.

12. The computer-readable medium of claim 11, further comprising the step of reconciling an ending balance in the first financial statement with an opening balance in a personal data store by:

comparing the earliest dated transaction in the personal data store to the earliest dated transaction in the financial statement to determine whether the earliest dated transaction in the personal data store is later than the earliest dated transaction in the financial statement;

if the earliest dated transaction in the personal data store is not later than the earliest dated transaction in the financial statement, then determining whether any of the transactions of the financial statement have been downloaded into the personal data store;

if none of the transactions of the financial statement have been downloaded into the personal data store, then calculating a correct beginning balance that is different from the opening balance in the personal data store; and displaying the correct beginning balance.

13. The computer-readable medium of claim 12, further comprising the step of displaying a prompt indicating that the opening balance has changed to the correct beginning balance in the personal data store.

14. The computer-readable medium of claim 12, wherein the step of determining whether any of the transactions of the financial statement have been downloaded into the personal data store comprises:

comparing the ending balance in the financial statement to the transactions in the personal data store to determine whether any transaction date in the personal data store is the same as the ending period of the financial statement;

if so, then identifying any of the transactions of the financial statement having the same date as the transactions in the personal data store; and if none of the transaction dates in the personal data store are the same as the ending period of the financial statement, then locating the closest transaction date in the personal data store that occurs before the ending period of the financial statement and identifying any of the transactions of the financial statement having one of the transaction dates in a range extending between the closest transaction date in the personal data store and the earliest dated transaction in the personal data store.

15. The computer-readable medium of claim 14, further comprising the step of:

downloading the transactions of the financial statement into the personal data store; and marking the downloaded transactions with a flag to indicate those transactions in the personal data store that have been downloaded from the financial statement.

16. A method for automatically substituting for names of payees, wherein the names of the payees are received from the electronic transfer of financial data into a personal financial management program, comprising the steps of:

storing at least one preferred name assigned by a user for use within the personal financial management program in a dummy field of a data structure;

receiving an electronic financial statement transmitted from a financial services provider, wherein the electronic financial statement comprises one or more transaction entries, each transaction entry comprising an original payee name used by the financial services provider in the electronic financial statement and a transaction amount;

moving the original payee name to the dummy field;

associating the original payee name in the dummy field to the preferred payee name in the dummy field and indicating an assignment of the preferred payee name;

selecting an individual transaction for display, searching the dummy payee table to determine if there exists a match for the original payee name that indicates the assignment of the preferred payee name;

upon determining there exists a match in the dummy payee table for the original payee name and the assignment of the preferred payee name, automatically displaying the preferred payee name of the associated original payee name instead of the associated original payee name when an individual transaction listing the original payee name is accessed in a subsequently received electronic financial statement received from the financial services provider; and upon determining there does not exist a match, searching an active payee table to locate and display an original payee name.

\* \* \* \* \*

UNITED STATES PATENT AND TRADEMARK OFFICE
CERTIFICATE OF CORRECTION

PATENT NO.        : 7,403,916 B1                                Page 1 of 1
APPLICATION NO.   : 08/869872
DATED             : July 22, 2008
INVENTOR(S)       : Christopher Kevin Brownell et al.

It is certified that error appears in the above-identified patent and that said Letters Patent is hereby corrected as shown below:

In column 6, line 1, before "further" insert -- 20 --.

In column 6, line 6, after "drive" insert -- 30 --.

In column 11, line 10, after "payee" insert -- name --.

Signed and Sealed this
Fourteenth Day of August, 2012

David J. Kappos
*Director of the United States Patent and Trademark Office*